Aug. 13, 1940.   G. A. CARLSON ET AL   2,211,097
BRAKE ADJUSTMENT
Filed Feb. 10, 1939   2 Sheets-Sheet 1
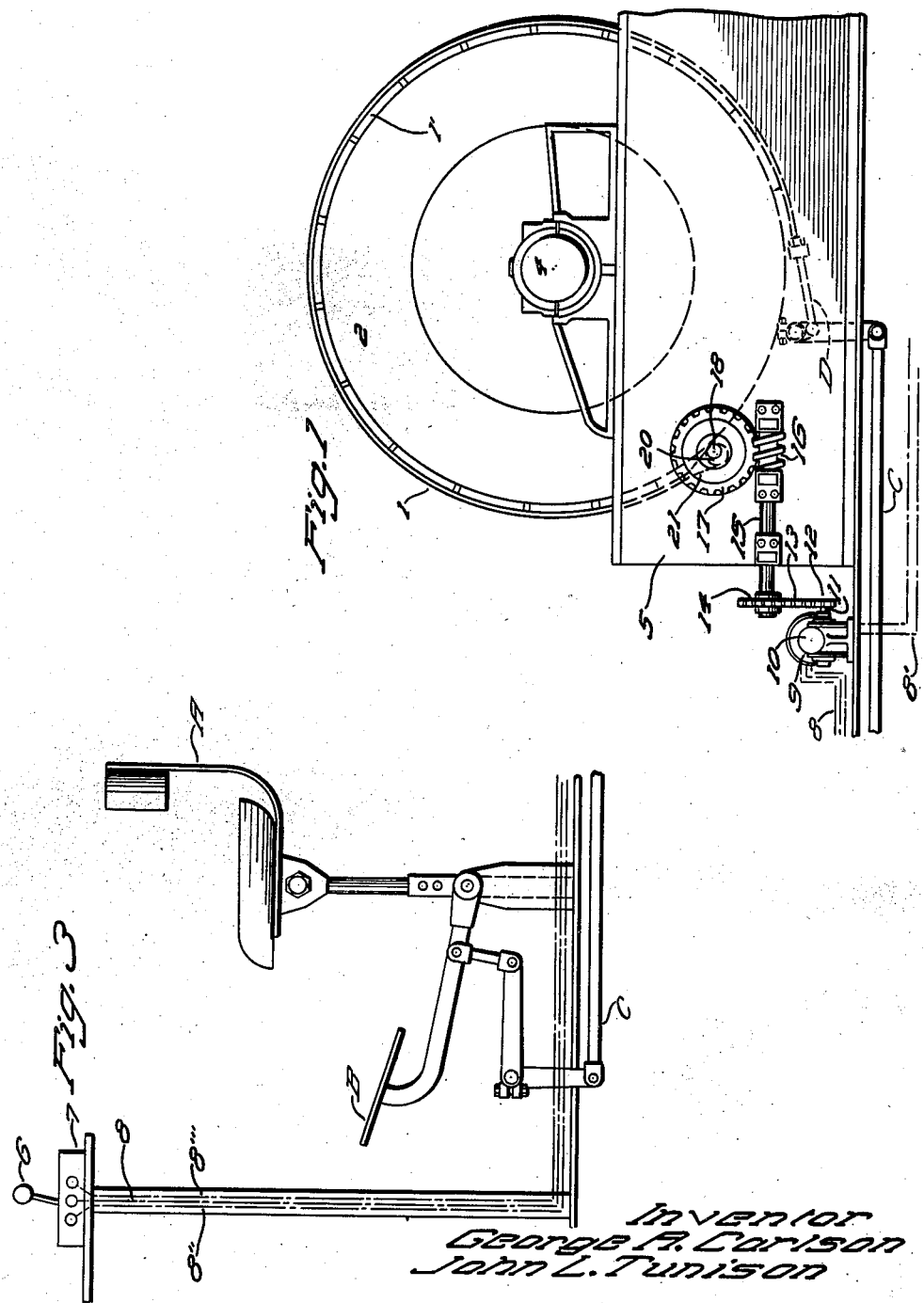

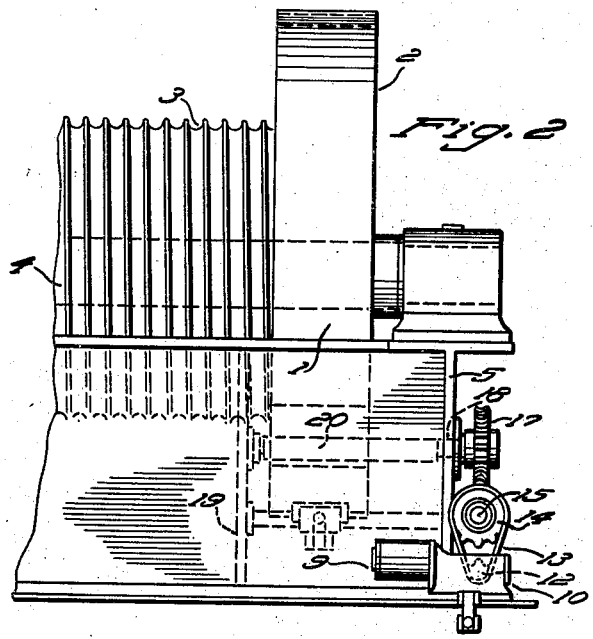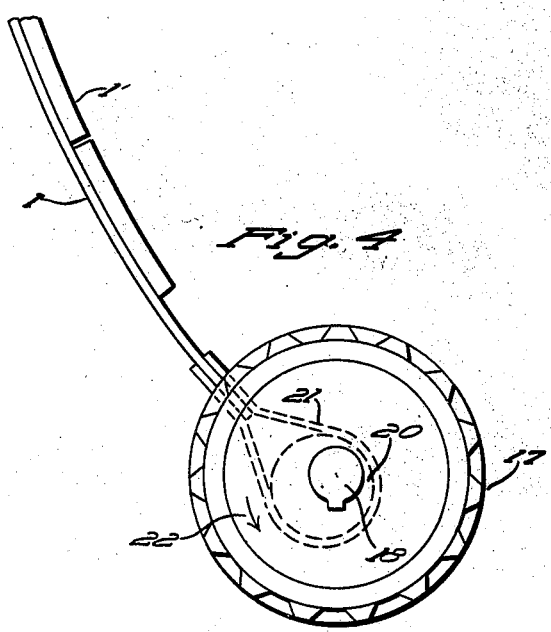

Patented Aug. 13, 1940

2,211,097

UNITED STATES PATENT OFFICE 2,211,097

BRAKE ADJUSTMENT

George A. Carlson and John L. Tunison, Chicago, Ill., assignors to Bucyrus-Monighan Company, Chicago, Ill., a corporation of Illinois Application February 10, 1939, Serial No. 255,620

2 Claims. (Cl. 188—79.5)

This invention relates to brake adjustment means associated with brake controls and convenient to a machine operator, the disclosure now made being particularly adapted for use in excavating machinery employing winding drums, as, for instance, dragline excavators.

An object of the invention is to provide an electric or equivalent motor driven brake regulating mechanism so that it may be controlled at a position distant from the brakes, and in the case of excavating machinery, to provide a control for the adjustment mechanism which for convenience and time saving is located in the control cab where the brakes are operated and may be tested during the adjustment. A further object of the improvement is to make possible prompt adjustments to an extremely fine degree.

The invention is illustrated in the accompanying drawings wherein:

Figure 1 is a side elevation showing the improvements applied to a brake drum.

Fig. 2 is a front elevation of the same arrangement.

Fig. 3 is a side elevation of the distant control means for an adjusting motor.

Fig. 4 is an enlarged detail view showing the adjustable anchored end of the brake band.

In the operation of dragline excavators where, because of the heavy weights handled, exact control of the brakes is essential, contraction or expansion of the brake drums resulting from changes in temperature due to weather conditions or severe operation necessitates frequent compensating readjustment of the brake bands. Ordinarily, only a slight adjustment may be necessary, but for safety and dependability of the brakes accuracy of adjustment is always required.

Heretofore adjustment was accomplished manually at the brake, with considerable inconvenience, the construction of dragline excavators being such that the brake bands are not easily accessible, and further, are distant from the brake and operating machinery controls. During the adjustment, while the brakes were being tested, the mechanic at the brake depended on instructions from the operator at the controls for determining the extent of adjustment needed, with a resulting tendency toward inaccuracy. The operation was consequently an awkward time-consuming process, and immediate precise regulation under these conditions was not possible.

To remove these disadvantages, the new arrangement provides a reversible motor connected by worm gearing to an eccentric fastened to the end of the brake band, the eccentric moving to either draw down the brake band toward the drum or by turning in the opposite direction to reduce tautness in the band. Due to the high ratio of the gearing, the eccentric moves at a relatively slow speed so that extremely minute adjustment of the brakes is possible. A reversible control switch for the motor is located in the operating cab of the excavator, enabling the operator to adjust and test the brakes simultaneously.

The drawings show in detail the improved brake adjusting mechanism in connection with a fragmentary showing of a winding drum and a diagrammatic showing of brake operating linkage. This linkage constitutes mechanical means for applying a brake. Generally in the heavier excavating machines hydraulic or pneumatic cylinders are employed for applying and releasing the brakes. Whatever the means employed for actuating the brakes, such means is generally controlled by a single operator in control of a plurality of winding drums, the driving machinery therefor, and the brakes. In the case of a dragline excavator one winding drum is used for the load line and another similar winding drum for the hoist line.

These drums are independently clutched and unclutched from the driving machinery, and the brakes therefor are independently operated under the control of a single operator who also controls the machinery for swinging the machine between loading and unloading positions. The performance of the machine is directly under the observation and control of a single man, and hence it is desirable to provide at his station means for instantly making corrections for expansion or contraction of the brake drums.

Fig. 3 of the drawings diagrammatically represents the operator's station, showing a chair A, a brake actuating treadle B, and linkage C, for mechanically drawing on the end D, Fig. 1, of the brake band I, for the purpose of applying the friction shoes I' of the band against a brake drum 2. The brake drum 2 is rigid with the winding drum 3 on a shaft 4, having bearings on a supporting enclosure 5.

The brake adjusting mechanism is under the control of a switch operating lever 6 for actuating a two-way switch 7. Current is led to the switch through conductor 8, which is connected at motor 9 with one of the line wires 8'. The switch 7 is normally off and the motor runs only when the switch lever 6 is brought to either side of its neutral position, which serves to connect the feed wire 8 with either the conductors 8" or 8'" leading to opposite sides of the motor. The direction of rotation of the motor is determined by the current flow therethrough, either from conductor 8" or conductor 8'" back to the line. The motor 9, Figs. 1 and 2, is connected through high ratio or reduction gearing in the housing 10 with a shaft 11 to which is fixed a sprocket 12. A chain 13 connects sprocket 12 with a sprocket wheel 14 fast to a shaft 15 having bearings on the supporting structure 5. A worm 16 carried by the shaft 15 drives a worm wheel 17 fast to a shaft 18 carried by and extending through the supporting enclosure 5 to a support 19. In the inner side of the enclosure 5 the shaft 18 is rigid with an eccentric 20, Fig. 4, around which is looped a strap 21 secured to one end of the brake band 1. As shown in the drawings, this is the anchored end of the brake band as distinguished from the brake lever or toggle operated end.

In the operation of the brake adjustment means, when it is desired to tighten the brake band 1, the motor 9 as controlled by the switch lever 6 is caused through the gearing to rotate eccentric 20 in the direction indicated by the arrow 22, Fig. 4. In this manner the anchored end of the brake band is shifted to draw down on the brake band and thus move its friction blocks 1' toward the brake drum. The movement of the eccentric is relatively slow due to the gear ratio, and accordingly, any danger of excessive adjustment is avoided as the movement of the eccentric relative to the rotation of the motor is minute. Corrective adjustment of the brakes may conveniently be done by a step-by-step movement of the motor through alternately closing and opening its circuit. The operator knows through feel of the brake mechanism when the most desirable adjustment is attained. When the adjusting motor is stopped, the leverage of the high ratio gearing and the drum gearing effectively resist backward turning of the worm wheel under the strain of the brake band through the eccentric.

The brake band is loosened as is required when there is expansion of the brake drum due to a rising temperature, particularly under exceptional service conditions, by an opposite throwing of switch lever 6 whereby the motor is connected for reverse rotation and through the worm wheel 17 adjusting the eccentric 20 in the opposite direction.

We claim:

1. Mechanism of the class described comprising a driven element and braking means therefor, said braking means including a movable friction member for engaging said driven element, operating means for shifting said friction member toward and away from said driven element, an adjustment device for regulating the normal space between said driven element and said friction member, an eccentric forming part of said adjustment device, a worm wheel actuating said eccentric, a worm meshing with said worm wheel, a shaft for said worm, a sprocket on said shaft, a sprocket chain leading from said sprocket to a second sprocket, an electric motor for rotating said second sprocket, a switch for effecting forward or reverse rotation of said motor, and conductors leading from said motor to said switch.

2. Mechanism of the class described comprising a driven element and braking means therefor, said braking means including a movable friction member for engaging said driven element, operating means for shifting said friction member toward and away from said driven element, an adjustment device for regulating the normal space between said driven element and said friction member, an eccentric forming part of said adjustment device, actuating means for said eccentric including a worm wheel and a worm meshing with said worm wheel, a shaft for said worm, an electric motor and high ratio transmission means between the motor and said shaft, a switch for effecting forward or reverse rotation of said motor, and conductors leading from said motor to said switch.

GEORGE A. CARLSON.
JOHN L. TUNISON.